United States Patent [19]

Matumoto

[11] Patent Number: 5,713,151

[45] Date of Patent: Feb. 3, 1998

[54] PASS-THROUGH FISHING ROD

[75] Inventor: Kiyohiko Matumoto, Sakai, Japan

[73] Assignee: Shimano Inc., Osaka, Japan

[21] Appl. No.: 531,408

[22] Filed: Sep. 21, 1995

[30] Foreign Application Priority Data

Oct. 11, 1994 [JP] Japan .................. 6-245037

[51] Int. Cl.$^6$ ................................ A01K 87/00
[52] U.S. Cl. ...................... 43/18.1; 43/24; 43/18.5
[58] Field of Search ................. 43/18.1, 24, 18.5

[56] References Cited

U.S. PATENT DOCUMENTS 3,862,509  1/1975  Petersen, Jr. ................. 43/17.5

FOREIGN PATENT DOCUMENTS

| | | | |
|---|---|---|---|
| 249360 | 8/1963 | Australia | 43/24 |
| 1127988 | 12/1956 | France | 43/18.1 |
| 73380 | 6/1960 | France | 43/18.1 |
| 2102545 | 4/1972 | France | 43/18.1 |
| 1-304836 | 12/1989 | Japan . | |
| 3-67554 | 7/1991 | Japan . | |
| 5-276853 | 10/1993 | Japan | 43/18.1 |
| 2249006 | 4/1992 | United Kingdom | 43/18.1 |

Primary Examiner—Jeanne Elpel
Attorney, Agent, or Firm—Jeffer, Mangels, Butler & Marmaro LLP

[57] ABSTRACT

A pass through fishing rod has a plurality of rod bodies, including a tip rod body having a first diameter and a plurality of larger-diameter rod bodies having successively increasing diameters greater than the first diameter. Each of the rod bodies has an inside surface defining a passage for a fishing line, a rear end section, and a front part having an inside diameter. The rod bodies are so formed that the rear end section of a rod body can be inserted and fastened to the inside surface of the front part Of a larger-diameter rod body. The fishing rod further includes line supporting means for supporting a fishing line which are installed in a portion of the inside surface of at least one rod body that is located further toward the rear end section of the rod body than the front part of the rod body. The line supporting means has an inside diameter that is larger than the inside diameter of the front part, such that a rod body can be inserted into a larger-diameter rod body in a position rearward of the position where the line supporting means are formed. The front part of a larger-diameter rod body has a wall thickness that is greater than the wall thickness of the remainder of the rod body.

19 Claims, 9 Drawing Sheets

PASS-THROUGH FISHING ROD

FIELD OF THE INVENTION

The present invention concerns a pass-through fishing rod having a construction which is formed so that the rear end part of a small-diameter rod body can be inserted and fastened to the inside surface of the front part of a large-diameter rod body, and in which line supporting means which support the fishing line are installed in an area located further toward the rear of the fishing rod than the front part, so that the fishing line passing through the interior of the rod is supported by the line supporting means, thus reducing rubbing resistance between the fishing line and the inside surface of the rod when the fishing line is fed out or taken up.

BACKGROUND OF THE INVENTION

One conventionally known pass-through fishing rod constructed as described above is the fishing rod described in Japanese Utility Model Application Laid Open No. 3-67554. The gist of this utility model is as follows: a construction is adopted in which spiral-form line supporting means are installed inside the respective rod bodies making up the pass-through fishing rod, so that rubbing resistance acting on the fishing line is reduced. In addition, the inside diameter of line supporting means which are installed in a large-diameter rod body is set so that it is larger than the outside diameter of the rear end part of a small-diameter rod body.

As a result of such a construction, the small-diameter rod body can be accommodated inside the large-diameter rod body up to and including the position of the line supporting means, so that even though line supporting means are installed inside the rod, a telescopic, or so-called "shake-out", rod can be constructed.

However, in order to make the inside diameter of the line supporting means installed in the large-diameter rod body larger than the outside diameter of the rear end part of the small-diameter rod body, the diameter of the large-diameter rod body is expanded from the front part of the rod body toward the rear portion of the rod body while the rod wall thickness remains constant. Accordingly, when a telescopic rod is extended for use as shown in FIG. 1 of the aforementioned utility model, the front part of the large-diameter rod body into which the rear end part of the small-diameter rod body is inserted and fastened counters the weight of the fish in an area where the outside diameter is decreased, so that the fishing rod has insufficient strength.

Specifically, in cases where a fish takes the hook and the fishing rod bows in response to this, the front part of the large-diameter rod body and the rear end part of the small-diameter rod body which is engaged with the front part of the large-diameter rod body attempt to return to a linear state which disturbs the mutual continuity of the bending of the rod bodies. Accordingly, a large load acts on this part so that the surface pressure is increased. Meanwhile, since the front part of the large-diameter rod body has a smaller diameter than the rear portion of the rod body, and since the rod wall thickness of the front part is the same as that of the rear portion, the strength of the rod becomes insufficient to counter such a large load, so that cracking caused by an insufficient surface pressure may occur in the tip opening part of the large-diameter rod.

SUMMARY OF THE PREFERRED EMBODIMENTS

The object of the present invention is to allow compact accommodation of small-diameter rod bodies inside large-diameter rod bodies even in a pass-through fishing rod in which line supporting means that reduce the resistance to the feed-out of the line is installed, and to form the front shape of each large-diameter rod body so that a large bending load can be handled when the fishing rod is used in a fully extended state.

In accordance with one aspect of the present invention, an improved pass-through fishing rod having internal line supporting means is provided. The inside diameter of the line supporting means is formed so that it is larger than the inside diameter of the front part, thus making it possible to insert the small-diameter rod body into the large-diameter rod body in a position inside the position where the line supporting means are formed. Furthermore, the rod wall thickness at the front part of the large-diameter rod body is set so that it is thicker than the rod wall thickness at the portion located further toward the rear. The effects and merits of this invention are as described below.

Since the inside diameter of the line supporting means is formed so that it is larger than the inside diameter of the front part, the small-diameter rod body whose rear end part is engaged with the inside surface of the front part can be inserted inside the position where the line supporting means are formed (since the small-diameter rod body tapers toward the tip). Accordingly, the small-diameter rod body can be accommodated inside the large-diameter rod body, so that compact stowage of the rod is possible.

Furthermore, since the rod wall thickness of the large-diameter rod body is greater at the front part of the rod body than it is in the rear portion where the line supporting means are installed, the bending load that occurs when a fish is hooked can be sufficiently handled, so that cracking of the tip opening parts of the rod, etc., can be prevented.

In spite of the fact that line supporting means are installed, the small-diameter rod body can be accommodated inside the large-diameter rod body so that compact rod stowage is possible. Accordingly, the fishing rod of the present invention is not burdensome to the angler when the fishing rod is carried while changing fishing locations, etc. Furthermore, since the rod wall thickness is set in accordance with positions where a load is applied so that the load can be withstood, cracking of the tip opening parts of the rod, etc., can be avoided.

Furthermore, since the rod wall thickness at the front part of the large-diameter rod body is large, the rigidity of this part can be increased, so that the front part becomes resistant to deformation. For example, the tendency of the direction of advance of the small-diameter rod body to deviate from the axial direction (during accommodation of the small-diameter rod body) that is seen in cases where the rigidity of the front part is low, so that the front part is easily deformed, is difficult to prevent using such a front part with low rigidity. In the case of the present invention, however, the rigidity of the front part is high. Accordingly, any large deviation from the axial direction can be prevented by means of the front part, so that damage to the line supporting means caused by the small-diameter rod body making contact with the line supporting means can be correspondingly reduced.

According to a preferred embodiment of the present invention, there is provided a fishing rod in which the outside surface extending from the front part of the large-diameter rod body to the portion located further toward the rear of the rod body is formed as a gradually inclined surface which has a constant inclination. The surface is caused to flare outward Slightly at the front part.

This preferred embodiment makes it easy to accomplish finishing work (such as painting or polishing, etc.) on the outside surface of the rod body in a case where the rod wall thickness of the front part of the large-diameter rod body is increased. Since the outside surface has a constant inclination, working conditions for painting and polishing can be set more easily than in cases where steps, etc., are present in the surface, and working is also easier. Furthermore, since the outside surface which determines the sectional modulus of resistance to bending forces, etc., is a surface with a constant inclination, there is no stress concentration of the kind seen in cases where steps are present. Accordingly, the strength of the rod body is correspondingly increased.

According to another preferred embodiment of the present invention, the line supporting means consist of concave/convex surfaces formed in the circumferential direction on the inside surface of a rod element consisting of reinforcing fibers and a resin.

This embodiment improves the adhesion between the line supporting means and the fishing rod: Specifically, since the line supporting means are formed on the inside surface of a rod element, a portion of the inside surface of the rod element constitutes the line supporting means. Accordingly, there is less concern that the degree of adhesion will be low than there is in cases where the line supporting means are formed separately from the rod element and is supported inside the rod by means of an adhesive agent or the pressure welding force arising from the elastic deformation of the line supporting means themselves, etc. Thus, even in cases where a fish is caught so that the rod is bent in a bow shape, there is no danger that the line supporting means will separate from the inside surface of the rod.

According to another preferred embodiment of the present invention, reinforcing fibers oriented in the circumferential direction are installed in the projecting surface parts.

This embodiment provides a fishing rod which is constructed so that the convex portions protruding from the inside surface of the rod element are reinforced, thus preventing weakening from easily occurring even in the case of contact with the fishing line.

Since reinforcing fibers are installed in the convex portions, the convex portions are reinforced. Furthermore, since these reinforcing fibers are oriented in the circumferential direction, the reinforcing fibers are positioned circumferentially. Accordingly, even if the position of the line should shift in the circumferential direction due to the running of a hooked fish, the function of the reinforcing fibers can be used to full advantage, since the reinforcing fibers are disposed in the position of the shift.

According to still another preferred embodiment of the present invention, the line supporting means comprise ring-form bodies.

This embodiment provides a fishing rod in which the materials, etc., used for the line supporting means can easily be selected.

Since the line supporting means comprise ring-form bodies, the means have the same shape as the external shape of the accommodated small-diameter rod body. Accordingly, the accommodation of the small-diameter rod body can be smoothly accomplished. Furthermore, since these ring form bodies are formed separately from the rod body, the materials, etc., used can be freely selected, which is advantageous from the standpoint of manufacture.

According to a further preferred embodiment of the present invention, the line supporting means comprise a helical body.

This embodiment provides a fishing rod in which the line supporting means can be handled more easily. Since the line supporting means comprise a helical body, the plurality of ring-form bodies described in the preceding preferred embodiment can be handled as a single body. Accordingly, the line supporting means can also be handled as a single body when mounted inside the rod body during manufacture. Thus, handling is facilitated.

In accordance with another aspect of the present invention, there is provided an improved pass-through fishing rod that includes a plurality of nested telescoping rod bodies including a tip rod body, and line supporting means for supporting a fishing line. Each rod body has an inside surface defining a passage for a fishing line, a rear end section, and a front part having an inside diameter. The front part of each rod body other than the tip rod body has a wall thicknesses that is greater than the wall thickness of the remainder of the rod body. The line supporting means are disposed on at least a portion of the inside surface of at least one rod body rearward from the front part thereof. The line supporting means have an inside diameter that is larger than the inside diameter of the front part.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
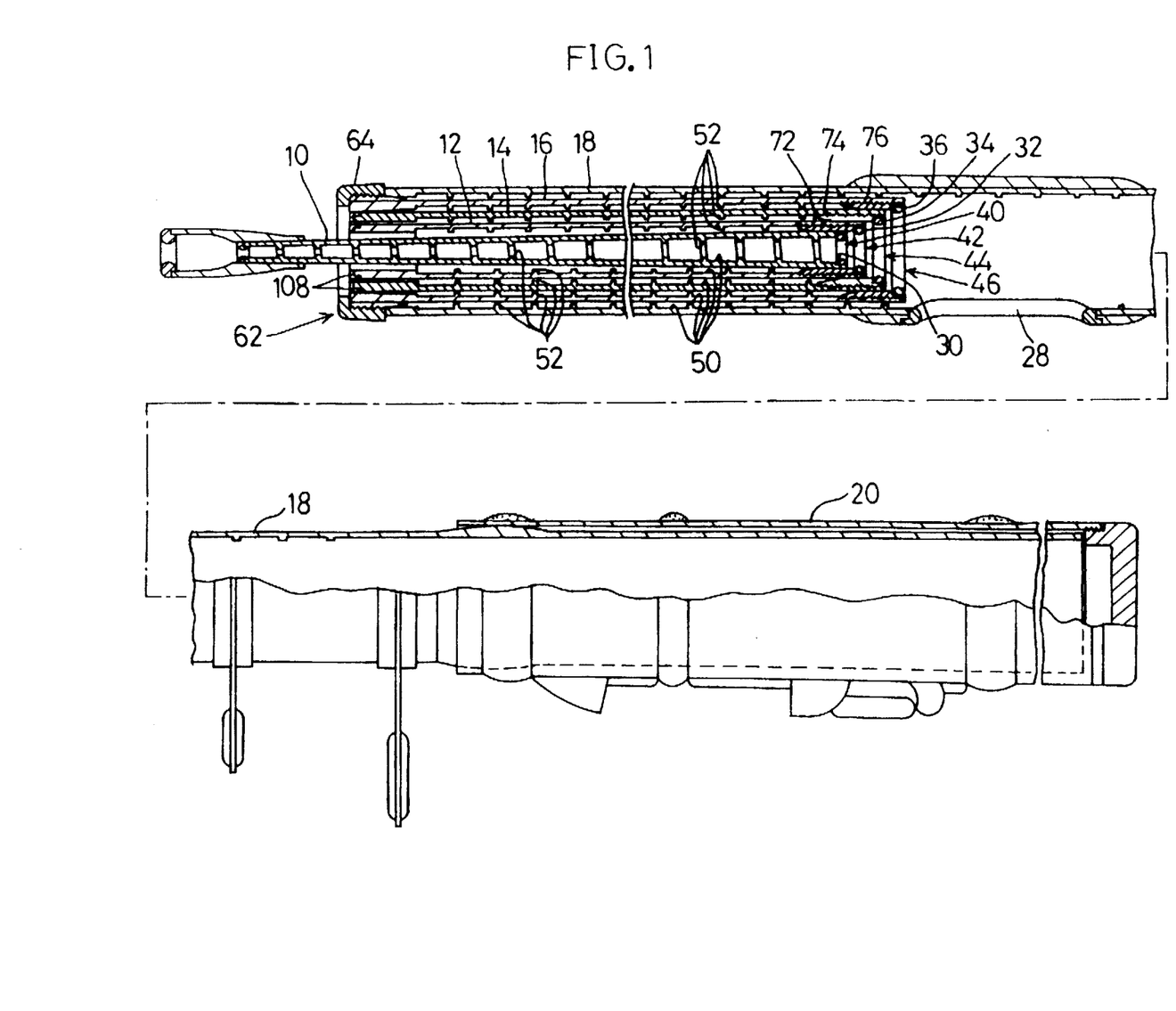
FIG. 1 is a partially cut-away side view which shows the tip rod and intermediate rods accommodated inside the base rod, and the auxiliary rod body covering the base rod.
Figure 2:
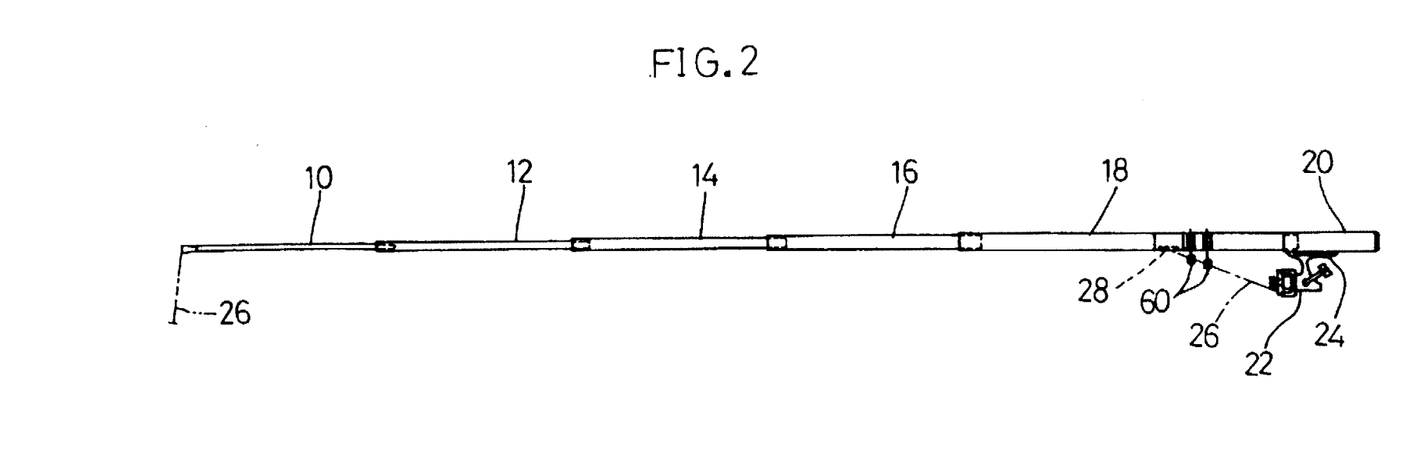
FIG. 2 is a side view which shows the tip rod, intermediate rods and auxiliary rod body extended with respect to the base rod.

As is shown in FIGS. 1 and 2, an exemplary telescopic type pass-through fishing rod according to the present invention comprises a tip rod 10, second rod 12, third rod 14 and fourth rod 16, as well as a base rod 18 on which tip rod 10, second rod 12, third rod 14 and fourth rod 16 are mounted, and an auxiliary rod body 20 which can be extended and retracted relative to the base rod 18. A reel 22 is attached to a reel leg mounting part 24 formed on the auxiliary rod body 20, and the fishing line 26 fed out from this reel 22 is passed through an oval line introduction hole 28 formed in the outside surface of the base rod 18; this line runs through the tip rod 10, second rod 12, third rod 14 and fourth rod 16.

Next, the tip rod 10, second rod 12, third rod 14 and fourth rod 16 will be described. As is shown in FIG. 1, hard line guide rings 30, 32, 34 and 36 which support the fishing line 26 are installed in the tip rod 10, second rod 12, third rod 14 and fourth rod 16 in order to reduce the rubbing resistance between the fishing line 26 and the rear-end openings 40, 42, 44 and 46. Furthermore, concave portions and convex portions 50 and 52 (described later) are formed on the inside surfaces of the respective rods 10, 12, 14, 16 and 18, so that the rubbing resistance acting on the fishing line 26 is reduced.

Next, the base rod 18 and auxiliary rod body 20 will be described. As is shown in FIGS. 1 and 2, two line guides 60 which are attached to the outer surface of the rod are installed between the line introduction hole 28 and the reel 22. These two line guides 60, 60 are set at different heights so that transverse swinging of the fishing line 26 between the reel 22 and the line introduction hole 28 is controlled. Furthermore, line introduction hole 28 into which the fishing line 26 from the reel 22 is introduced, and reel leg mounting part 24 which attaches the reel 22 to the auxiliary rod body 20, are installed in/on the base rod 18. The spacing between the tip end of the base rod 18 and the line introduction hole 28 is set at a spacing which corresponds to the lengths of the tip rod 10, second rod 12, third rod 14 and fourth rod 16. As a result of such a construction, the tip rod 10, second rod 12, third rod 14 and fourth rod 16 can be accommodated in the space between the tip end of the base rod 18 and the line introduction hole 28 perfectly.

Furthermore, the base rod 18 and auxiliary rod body 20 are connected in a telescoping arrangement, and engagement grooves are provided so that the front part of the auxiliary rod body 20 and an intermediate part of the base rod 18, as well as the butt end part of the auxiliary rod body 20 and the butt end part of the base rod 18, are engaged in the retracted state.

Next, the positioning means 62 which is used to position the rear-end openings 40, 42 and 44 of the tip rod 10 and the first and second intermediate rods 12 and 14 in the vicinity of the line introduction hole 28 when the rods are in the accommodated state will be described.

As is shown in FIG. 1, a screw part is formed on the tip end of the fourth rod 16, and a cap 64 is provided which is screwed onto this screw part. The rear-end opening 46 of the fourth rod 16 can be positioned in the vicinity of the line introduction hole 28 by causing one end of cap 64 to contact the tip end of the base rod 18. In regard to the other rods 10, 12 and 14, the fishing rod is constructed so that the rear-end openings 40, 42 and 44 of the respective rods 10, 12 and 14 can be positioned in the vicinity of the line introduction hole 28 by engaging the rear-end openings 40, 42 and 44 of the inside rods with attachment seats 72, 74 and 76 which are provided as intermediary parts that mount the line guide rings 32, 34 and 36 on the rear-end openings 42, 44 and 46. Thus, the cap 64 and tip end of the base rod 18, together with the rear-end openings 42, 44, 46 and attachment seats 72, 74, 76 of the respective intermediate rods 12, 14 and 16, are referred to as the positioning means 62.

Next, the process used to form the concave portions and convex portions 50 and 52 on the inside surfaces of the respective rods (tip rod 10 through base rod 18) will be described in terms of the method used to manufacture the fishing rod.

As is shown in FIG. 3 (a), wax 80 is applied as a mold releasing agent to mandrel 82. Mandrel 82 is used to define the basic shape of the subsequently produced rod. As shown in FIG. 3 (b), polyester tape 84 used for mold release is tightly wrapped around mandrel 82 on top of wax 80 so that the side edges of tape 84 contact each other, that is, so that the side of a rotation of tape 84 either overlaps or abuts the side of the next rotation so that no gaps are formed between adjacent windings. Then, in this state, tape 86 for concave/convex forming is wrapped (with a prescribed spacing in the axial direction of the mandrel) as shown in FIG. 3 (c). The base material of this tape 86 which is used to form the concave/convex surface is a fabric, and must have good pliability in order to allow application to a slender mandrel 80, heat resistance in order to maintain the precision of the concave/convex surface and stretching resistance in order to maintain the precision of the spacing in the axial direction of the mandrel. Then, as is shown in FIG. 3 (d), polyester tape 88 used for mold release purposes is tightly wrapped around the outer surface of the tape 86 used for concave/convex formation, so that the side edges of tape 86 contact each other. As a result, peeling of tape 86 used to form the concave/convex surface is facilitated.

Figure 3A:
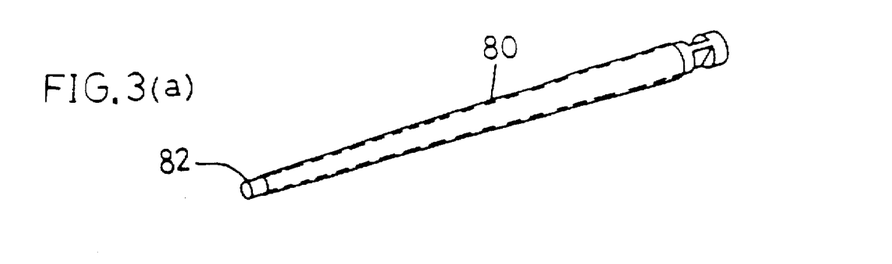
FIGS. 3a–d are a perspective views which illustrate the first half of the rod formation process.
Figure 3B:
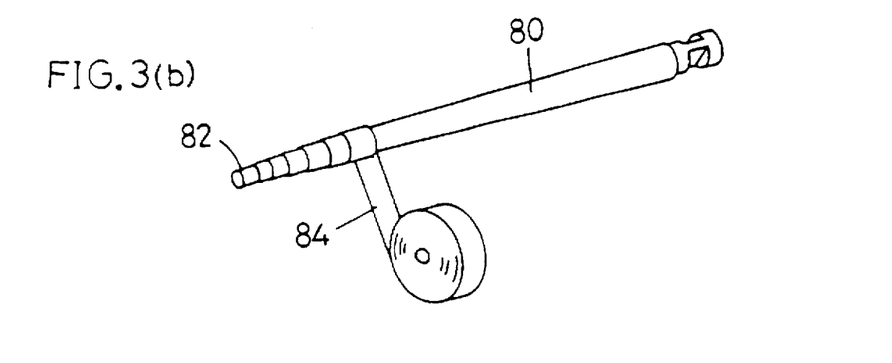
Figure 3C:
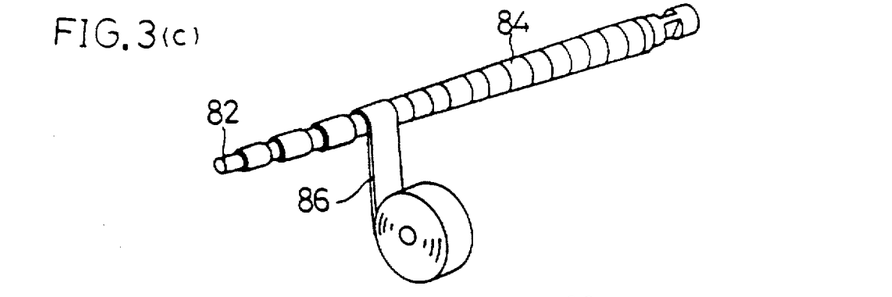
Figure 3D:
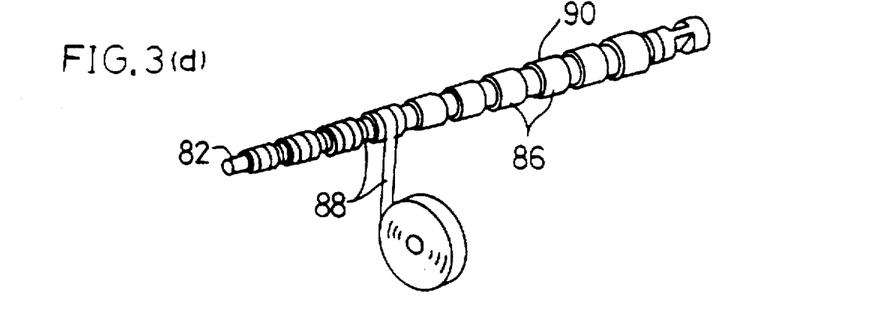

The assembly formed by wrapping tape 86 used for concave/convex formation is coated with an oily wax 90, so that the peeling of tape 86 can easily be accomplished. Furthermore, this oily wax 90 is left on the portions of the inside surface of the rod where tape 86 is not present (i.e., the portions corresponding to the convex portion 52 among the concave portions and convex portions 50 and 52 described later), so that water-repelling properties are obtained.

Then, as is shown in FIG. 4 (a), a prepreg tape 92 which forms the convex portion 52 (described later) is wrapped so that it fills the spaces between tape 86 used for concave/ convex formation.

Figure 6:
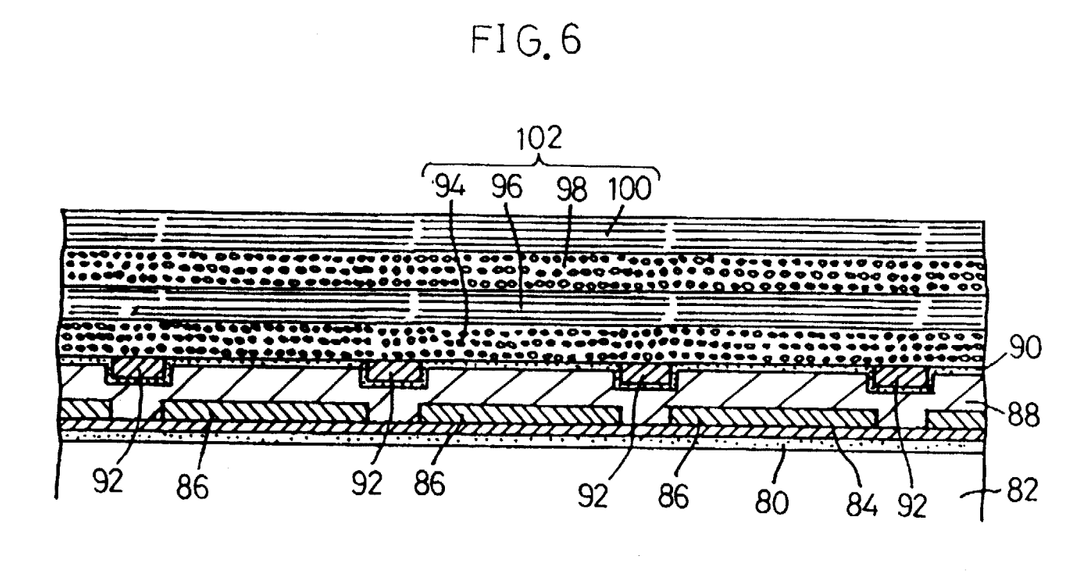
FIG. 6 is a longitudinally sectional side view of the rod element obtained when the process of FIG. 5 (b) is completed.

In this state, as is shown in FIG. 4 (b), a sheet-form prepreg which preferably is made of epoxy resin-impregnated carbon fibers (oriented in the circumferential direction) is cut into tape form, and the resulting tape 94 is tightly wrapped so that the side edges of tape 94 contact each other, thus forming an innermost layer. The prepreg can also be made of other resins, such as phenolic resins, and other fibers, such as glass fibers. Then, as is shown in FIG. 4 (c), a prepreg tape 96 in which carbon fibers are oriented in the axial direction is tightly wrapped so that the side edges of tape 96 contact each other, thus forming a second layer. Then, a prepreg tape 98 in which carbon fibers are oriented in the circumferential direction and a prepreg tape 100 in which carbon fibers are oriented in the axial direction are similarly wrapped, thus forming a third layer and a fourth layer. As a result, a rod element 102 with a four-layer structure is formed as shown in FIG. 6.

Figure 4A:
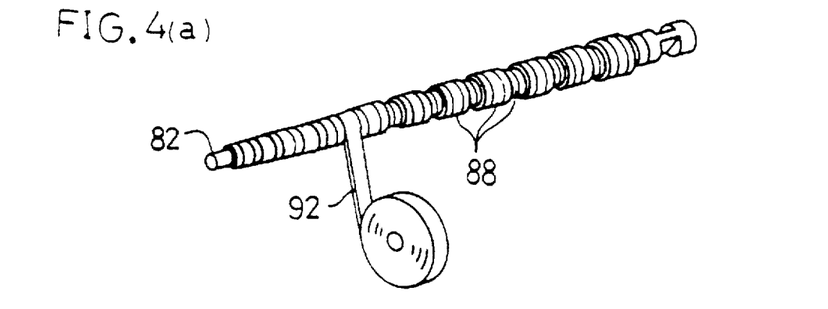
FIGS. 4a–d are a perspective views which illustrate an intermediate part of the rod formation process.
Figure 4B:
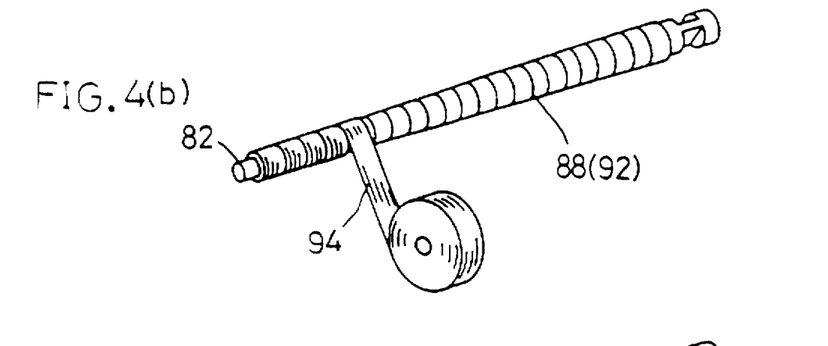
Figure 4C:
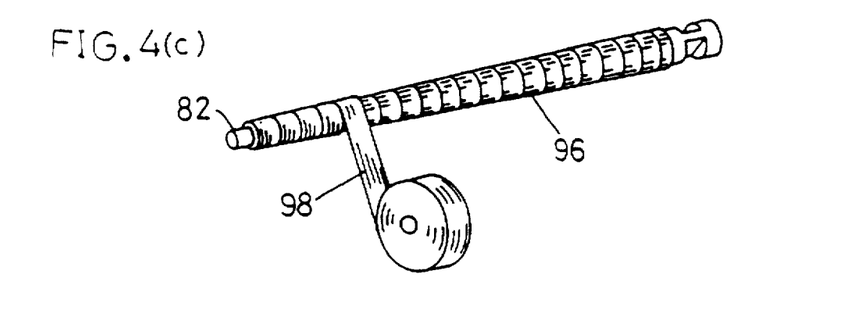
Figure 4D:
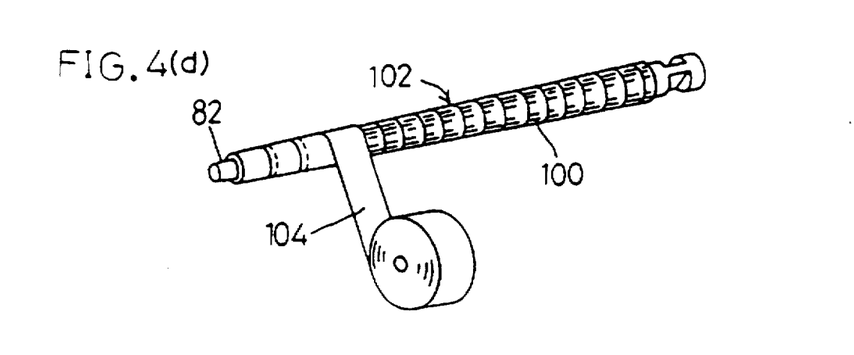
Figure 5A:
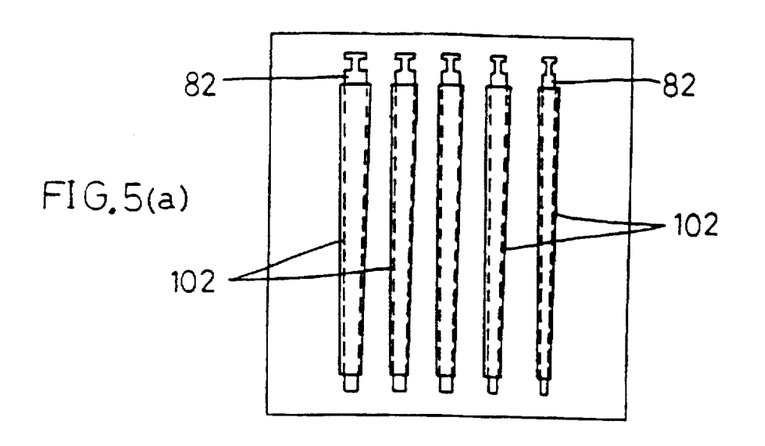
FIGS. 5a–c are a perspective views which illustrate the last half of the rod formation process.
Figure 5B:
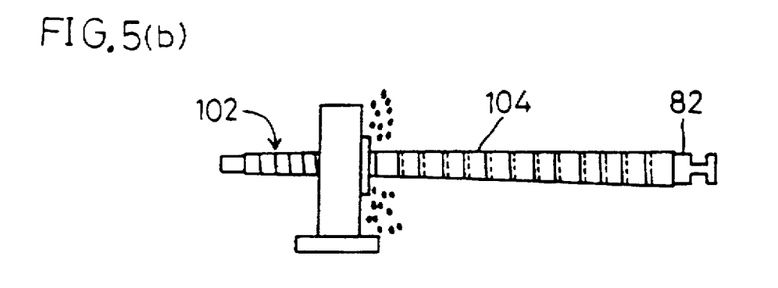
Figure 5C:
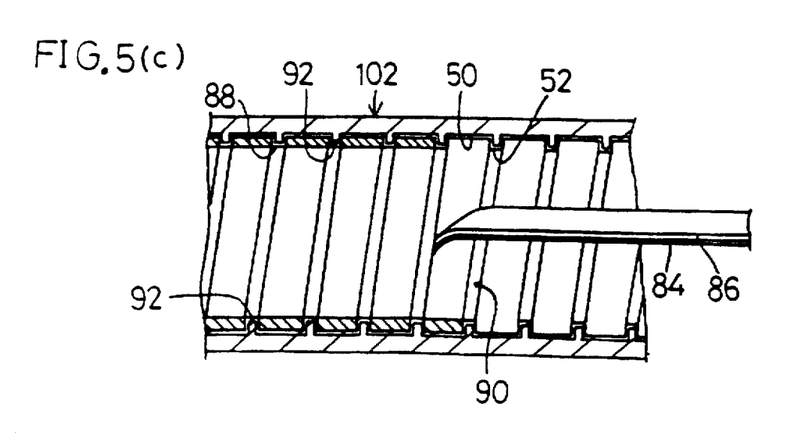

As is shown in FIG. 4 (d), a polyester tape 104 used as a protective tape is wrapped around the abovementioned rod element 102. Then, the rod element 102 is hardened as shown in FIG. 5 (a). The rod element can be hardened by any of a variety of hardening means, such as exposing the layers to ultraviolet light, heating the material or adding a hardening agent. Then the polyester tape 104 is stripped away following hardening as shown in FIG. 5 (b), and the mold release tapes 84 and 88 are removed together with tape 86 used for concave/convex formation as shown in FIG. 5 (c). As a result, a rod element 102 which has helical concave portions and convex portions 50 and 52 on its inside circumferential surface is formed, and fibers which are oriented in the circumferential direction are installed inside convex portion 52.

Figure 7:
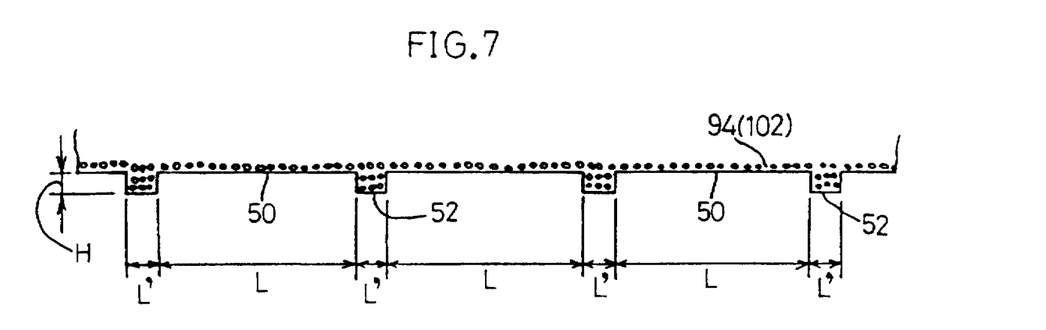
FIG. 7 is a longitudinally sectional side view which illustrates the cross-sectional shape of the concave/convex surfaces.

Next, the shapes of the concave portions and convex portions 50 and 52 will be described. As is shown in FIG. 7, the dimensions of the concave portions and convex portions 50 and 52 are as follows: i.e., the width L' of the convex portion 52 is 0.8 to 1.2 mm, the width L of the concave portion 50 is 6.7 to 7.3 mm, and the height H of the convex portion 52 is 0.4 to 0.6 mm. The cross-sectional shape of the convex portion 52 is close to square; however, a trapezoidal or triangular cross-sectional shape, etc., may also be used. Furthermore, the corner parts may be rounded so that corner parts are not sharp.

Figure 8:
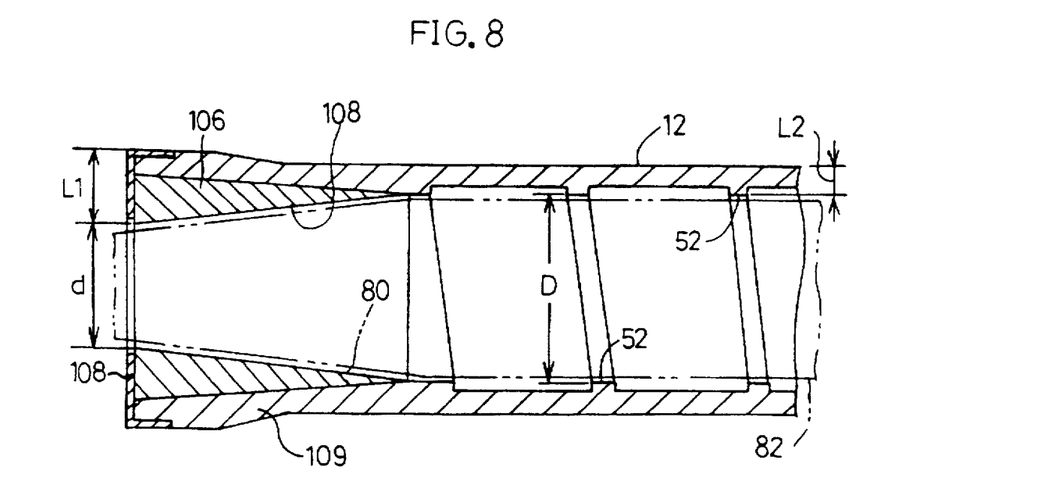
FIG. 8 is a longitudinally sectional side view which illustrates the opening parts of the second and third rods.
Figure 9:
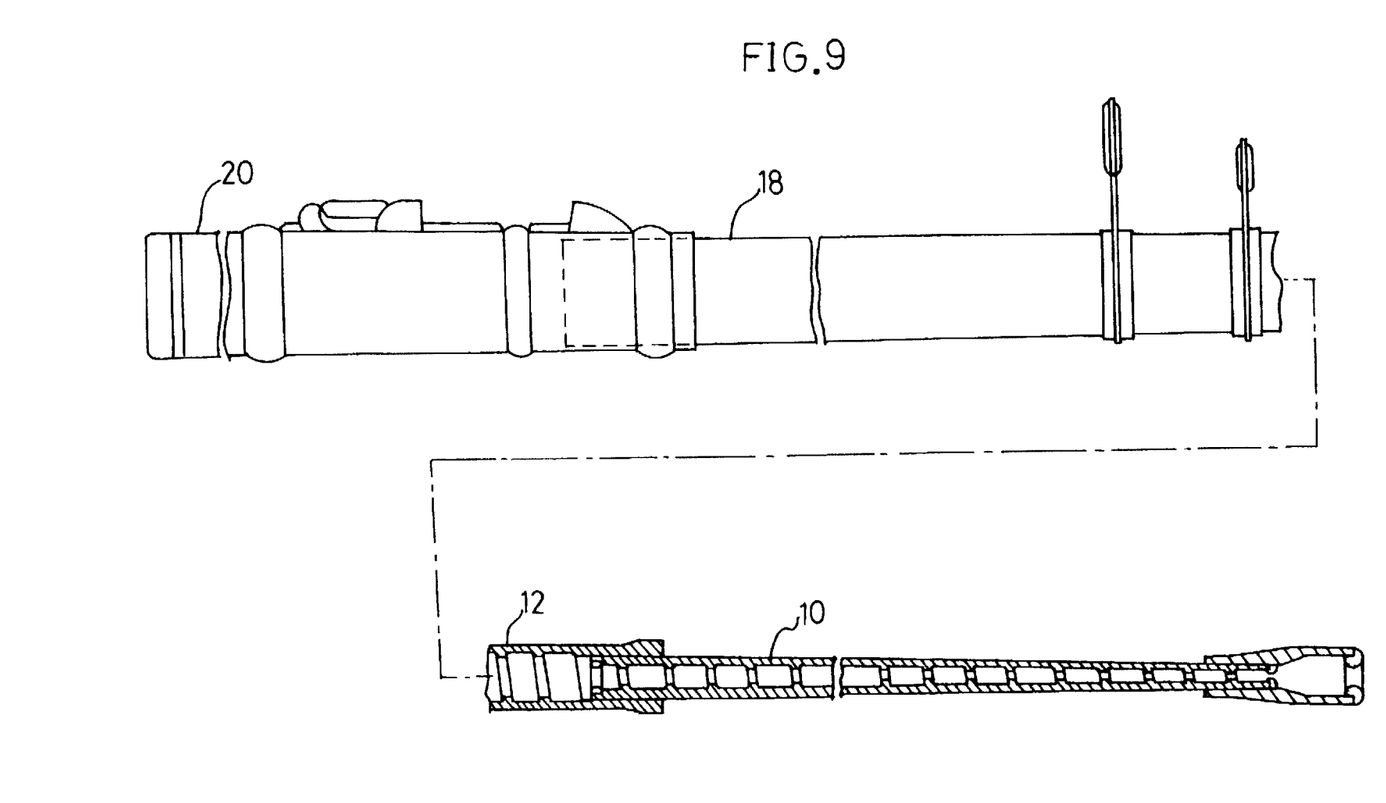
FIG. 9 is a fragmentary, partially cut-away side view which shows the fishing rod of FIG. 1 in its extended state, showing the accommodation of the tip rod within the second rod.

Next, the engagement structures at the tip ends of the second rod 12 through the base rod 18 will be described. Since the respective structures are identical, the second rod 12 will be used as an example. As is shown in FIG. 8, after the mandrel 80 has been coated with wax 80, a prepreg pattern 106 used as an alignment part is wrapped around the position corresponding to the tip end of the second rod 12, so that the inside surface which is used as an alignment part is formed as a taper surface showing an increase in diameter in the rearward direction. The rod wall thickness L1 in this alignment part (108) is set so that it is greater than the rod wall thickness L2 in the area where the concave portions and convex portions 50 and 52 are formed (further to the rear). Furthermore, the inside diameter d of the alignment part (108) is set so that it is smaller than the inside diameter D of the convex portion 52. As a result, (e.g.) the second rod 12 (as a small-diameter rod body) can be accommodated inside the third rod 14 (as a large-diameter rod body) as far as the position where the concave portions and convex portions are formed. Thus, when the respective rods (from the tip rod 10 to the fourth rod 16) are accommodated, the resulting configuration is as shown in FIG. 1. In this case, the auxiliary rod body 20 can be retracted so that it covers the base rod 18.

In the figures, 108 indicates mouth fittings which protect the tip ends of the rods. Furthermore, since the convex portion 52 is formed by wrapping a prepreg tape 92 so that tape 92 fills the spaces between tape 86 used for concave/convex formation as shown in FIG. 4 (d), the respective layers from the second layer on can be wrapped without generating any step parts; accordingly, the rod element 102 exhibits a gradually inclined outer surface with a constant inclination.

However, the outer surface at the front parts of the respective rods show a slight flare or expansion 109 formed by the wrapping of the prepreg pattern.

Additional preferred embodiments of the concave portions and convex portions 50 and 52 are described below.

In the abovementioned first preferred embodiment, the concave portions and convex portions surfaces 50 and 52 are formed in a helical configuration as shown in FIG. 5 (c). However, it is also possible to use ring-form convex portions 52. In such a case, when tape 86 used for concave/convex formation is wrapped, it is necessary to wrap tape 86 in the form of a ring for each concave portion 50.

If convex portions 52 are thus formed as ring-form parts oriented in the circumferential direction, the convex portions 52 will be oriented in the same direction as the aforementioned carbon fibers installed in the circumferential direction. In this case, since the carbon fibers do not intersect with the change-over points between concave portions and convex portions, there is no bending. Accordingly, the strength of the rod against bending can be maintained at a high level.

Next, the cross-sectional shape of the convex portion(s) 52 may also be trapezoidal. Such a shape facilitates the stripping of tape 86 used for concave/convex formation, and prevents wear of the corner parts of the convex portion(s).

A prepreg similar to that used for the rod elements 102 typically is used to form the concave portions and convex portions 50 and 52. However, it is also possible to form convex portions 52 from a different material than that used for the rod elements 102. Specifically, ring-form parts might be formed from a hard material such as a ceramic, etc., or a helical body might be formed from a metal material.

In such cases, various materials may be selected, and the shape may also be designed as desired. Specifically, the cross-sectional shape of the convex portion(s) 52 may be round, oval or square, etc. Furthermore, in the case of ring-form parts, the parts do not have to be complete rings, but may have portions cut away. Furthermore, the parts may be C-shaped parts with large cut-away portions. In regard to the material of the line supporting means, hard materials such as ceramics or metals, etc., are most commonly used. However, it is also possible to use soft materials such as plastics or rubber, etc. Furthermore, the surfaces of line supporting part 20 may be coated with a material which improves the slipping of the fishing line.

The accommodatable tip rod 10 and the second rod 12 are respectively referred to as a "small-diameter rod body" and a "large-diameter rod body". The respective rods up to the base rod 18 are both large-diameter rod bodies and small-diameter rod bodies.

Figure 10:
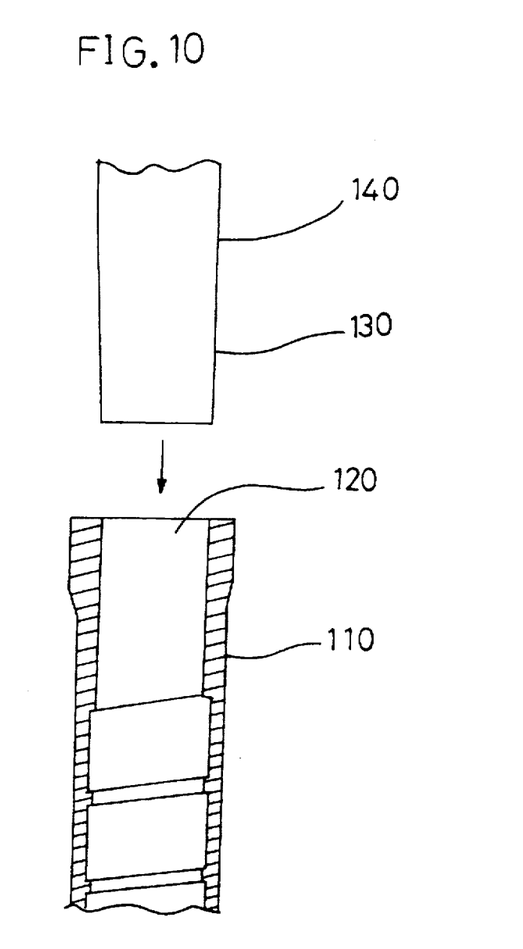
FIG. 10 is a cut-away side view illustrating an alternate embodiment of the invention in which the fishing rod is a standard-joint fishing rod.

In the above embodiments, examples in which the present invention was applied to a telescopic rod were described; however, the present invention could also be applied to a standard-joint rod. FIG. 10 illustrates this alternative embodiment, showing a second rod 140 having a front part 130 adapted to be received within opening 120 in the rear end of tip rod 110.

What is claimed is:

1. A pass-through fishing rod comprising a plurality of rod bodies including a tip rod body having a first diameter and a plurality of larger-diameter rod bodies having successively increasing diameters greater than said first diameter, each of said rod bodies having an inside surface defining a passage for a fishing line, a rear end section, and a front part having an inside diameter, said rod bodies being so formed that the rear end section of a rod body can be inserted and fastened to the inside surface of the front part of a larger-diameter rod body, and further comprising line supporting means for supporting a fishing line which are installed in a portion of said inside surface of at least one rod body that is located further toward said rear end section of said rod body than said front part of said rod body, wherein said line supporting means has an inside diameter that is larger than the inside diameter of said front part, such that one of said rod bodies can be inserted into a larger-diameter rod body in a position rearward of the position where said line supporting means are formed, and wherein the front part of a larger-diameter rod body has a wall thickness that is greater than the wall thickness of the remainder of said rod body.

2. The pass-through fishing rod of claim 1 wherein each said larger-diameter rod body has an outside surface extending from said front part rearward that is a formed as a gradually inclined surface with a constant inclination, and with an expansion at said front part.

3. The pass-through fishing rod of claim 1 wherein said line supporting means comprises a plurality of concave portions and convex portions formed in the circumferential direction on said inside surface of said at least one rod body, said line supporting means comprising reinforcing fibers and a resin.

4. The pass-through fishing rod of claim 3 wherein said convex portions comprise reinforcing fibers aligned in the circumferential direction.

5. The pass-through fishing rod of claim 1 wherein said line supporting means comprises ring-form bodies.

6. The pass-through fishing rod of claim 1 wherein said line supporting means comprises a helical body.

7. A pass-through fishing rod comprising (a) a plurality of nested telescoping rod bodies including a tip rod body,
    each said rod body having an inside surface defining a passage for a fishing line, a rear end section, and a front part having an inside diameter,
    wherein the front part of each said rod body other than said tip rod body has a wall thicknesses that is greater than the wall thickness of the remainder of said rod body, and (b) line supporting means for supporting a fishing line disposed on at least a portion of the inside surface of at least one rod body rearward from the front part thereof, said line supporting means having an inside diameter that is larger than the inside diameter of said front part.

8. The pass-through fishing rod of claim 7 wherein each said rod body other than said tip rod body has an outside surface extending from said front part rearward that is a formed as a gradually inclined surface with a constant inclination, and with an expansion at said front part.

9. The pass-through fishing rod of claim 7 wherein said line supporting means comprises a plurality of concave portions and convex portions formed in the circumferential direction on said inside surface of said at least one rod body, said line supporting means comprising reinforcing fibers and a resin.

10. The pass-through fishing rod of claim 9 wherein said convex portions comprise reinforcing fibers aligned in the circumferential direction.

11. The pass-through fishing rod of claim 7 wherein said line supporting means comprises ring-form bodies.

12. The pass-through fishing rod of claim 7 wherein said line supporting means comprises a helical body.

13. The pass-through fishing rod of claim 7 wherein a guide ring is disposed within the rear end section of each said rod body.

14. The pass-through fishing rod of claim 7 wherein said rod bodies comprise a base rod body having a tip end.

15. The pass-through fishing rod of claim 14 wherein said base rod body has defined therein a fishing line introduction hole.

16. The pass-through fishing rod of claim 15 wherein said fishing line introduction hole is spaced from said tip end of said base rod body such that the space so defined is capable of accommodating the remainder of said plurality of nested telescoping rod bodies such that at most a portion of said tip rod body protrudes from said space.

17. The pass-through fishing rod of claim 15 wherein said tip end of said base rod body has a threaded outer surface.

18. The pass-through fishing rod of claim 17 further comprising a cap having an internal thread capable of engaging said threaded outer surface of said base rod body.

19. The pass-through fishing rod of claim 14 further comprising an auxiliary rod body within which said base rod body is telescopically engaged.

* * * * *